Dec. 18, 1956 R. F. DODD ET AL 2,774,616
QUICK RELEASE COUPLING HAVING DETACHABLE
SCREW THIMBLE-GLAND
Filed May 7, 1953
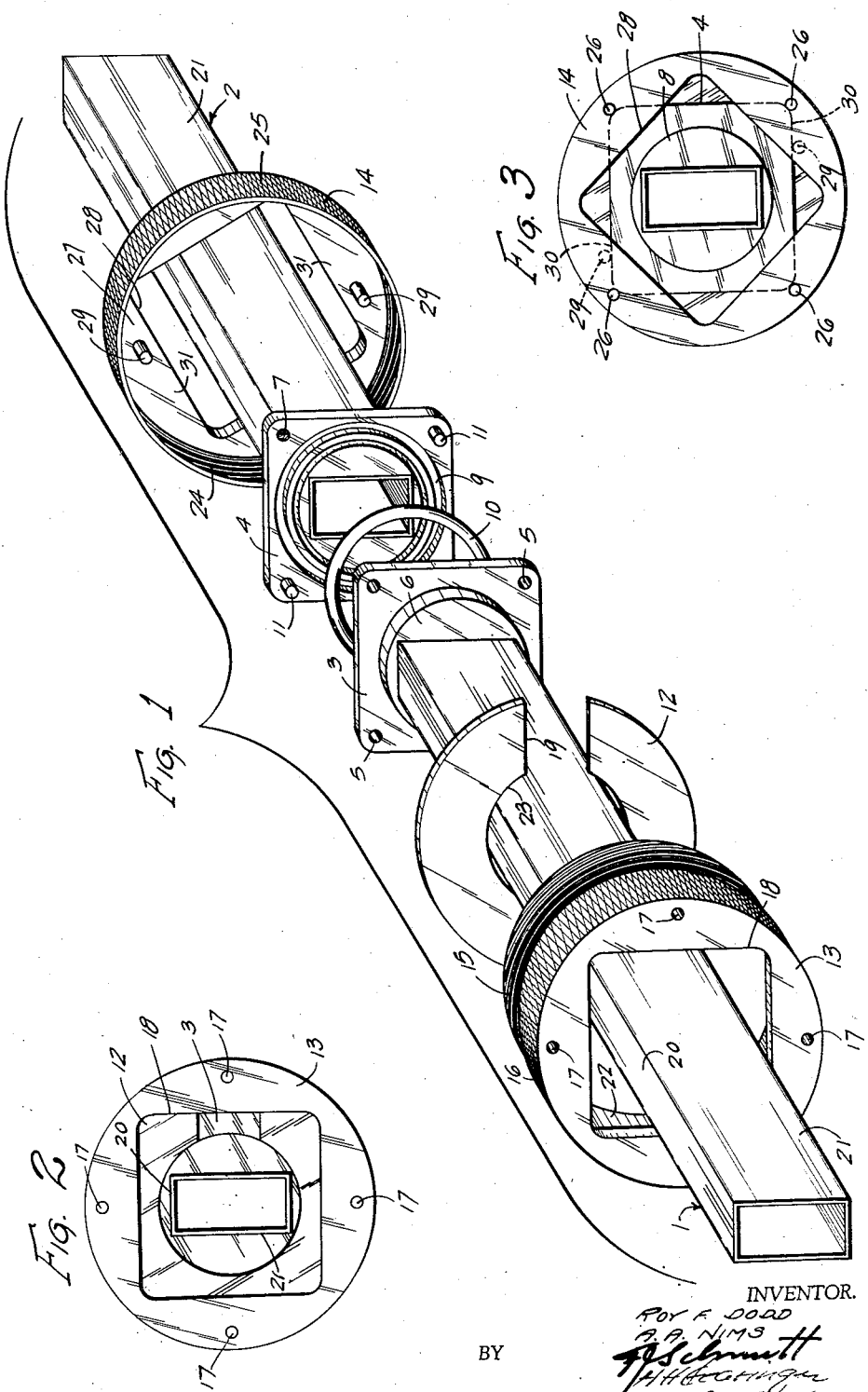
INVENTOR.
ROY F. DODD
R. A. NIMS
BY
ATTORNEYS

United States Patent Office 2,774,616
Patented Dec. 18, 1956

2,774,616

QUICK RELEASE COUPLING HAVING DETACHABLE SCREW THIMBLE-GLAND

Roy F. Dodd and Albert A. Nims, Baltimore, Md., assignors, by mesne assignments, to the United States of America as represented by the Secretary of the Navy Application May 7, 1953, Serial No. 353,460

2 Claims. (Cl. 285—33)

The invention described herein may be manufactured and used by or for the Government of the United States of America for governmental purposes without the payment of any royalties thereon or therefor.

This invention relates to couplings and more specifically to a quickly releasable coupling for use in joining flanged waveguide sections.

In many high frequency electronic equipments waveguide sections of varying cross-sectional sizes are utilized to conduct high frequency radio waves. These waveguides normally contain a gas under pressure and are often located in relatively inaccessible locations in a complicated installation. For this reason, presently known waveguide coupling units are inadequate because their assembly and disassembly under the conditions described above is difficult and time consuming.

The waveguide sections are of rectangular configuration and are ordinarily fitted with rectangular or square flanges at their ends to permit coupling. The usual method of joining the flanges on adjacent sections by means of bolts or screws was found to be unsatisfactory because of time and space requirements for a fastening or releasing operation.

Prior attempts to provide coupling means which could be more quickly and easily operated failed to efficiently solve the problem because they required specially constructed flanges, were liable to cause uneven pressures and result in leaks at the joint and depended on spring pressure or tension rather than a positive force applied through rigid means.

Applicant has invented a solution to the problem which provides a relatively simple, effective closure which can be quickly and easily applied or removed from a waveguide section and which requires no modification of any sort to the usual flanged waveguide. The coupling unit is releasably attached to one of the sections to be joined and coupling or disassembly may be effected without removing the unit from that section so that loss or misplacement of the unit is avoided.

It is an object of the invention to provide a novel and effective coupling unit for flanged waveguide sections.

It is another object of this invention to provide such a unit for use with conventional waveguide sections without requiring the modification in any way of the waveguide flange or sealing means.

Still another object of the invention is the teaching of a relatively simple, yet sturdy coupling unit which can be easily and quickly assembled or disassembled in restricted or relatively inaccessible locations.

Other objects and many of the attendant advantages of this invention will be readily appreciated as the same becomes better understood by reference to the following detailed description when considered in connection with the accompanying drawings wherein:

Figure 1 is an exploded view of the coupling unit and waveguide sections;

Figure 2 shows the assembled joint from one end; and

Figure 3 is a view taken from the end of the joint opposite Figure 2.

Looking at Figure 1, 1 and 2 are conventional rectangular waveguide sections provided with flanges 3 and 4. The flange 3 has a drilled through-hole 5 at each corner and is backed by an attaching collar 6. The flange 4 is provided with tapped holes 7 and is likewise backed by a collar 8. The flange 4 has a gasket groove 9 on its mating face to receive a washer or gasket 10, thus effecting a seal between the faces of the two flanges when pressure is applied to the flanges.

The invention comprises a pair of pins 11 threaded into diagonally opposite holes 7, a retaining ring 12, an externally threaded plug portion 13 and an internally threaded collar 14. Pins 11 may be provided in all four corners of the flange 4 and are of a diameter to fit snugly in the holes 5 of flange 3 to thereby align the two flange portions.

Plug portion 13 is externally threaded as at 15 and can be knurled to provide a gripping surface 16. Holes 17 are provided to permit engagement and rotation of the plug by a spanner wrench or the like. A rectangular opening 18 in the plug body permits it to be inserted onto the channel section over the flange at the end thereof where it is retained by the ring 12, the dimensions of said opening being slightly greater than the dimensions of the flange. The retaining ring is a relatively flat, annular ring with a slot 19 formed at one side and the width of the slot 19 being somewhat less than the dimension of side 21 of a cross-section of the waveguide and being slightly greater than the length of the short side 20, the ring 12 can be slipped over the waveguide and rotated so that its slot is out of registry with the side 20 to act as a retainer preventing the removal of the plug 13. The plug is counterbored at 22 so that it fits around the ring 12 and when the plug is moved into position for mating with a collar on an adjacent waveguide section, the inner circle 23 of the retaining ring fits over the projecting portion of the collar 6 and helps align the plug with the fitting on said adjacent section.

The collar 14 is internally threaded at 24 and may also be provided on its outside surface with knurling 25 and with spanner wrench engaging notches 26. The collar is closed at one end by a plate 27 having therethrough a rectangular opening 28 of slightly larger dimensions than the flange 4 which permits the collar to pass over said flange and be inserted on the waveguide section. A pair of pins 29 are secured to the plate 27 diametrically opposite each other and spaced apart a distance somewhat less than the length of a diagonal of the flange 4. Pins 29 are located off-center with respect to a side of the opening 28 so that upon relative rotation between the collar and the flange 4 said pins will abut the edge 30 of said flange and position each corner of the flange approximately centrally of each segment 31 of the plate 27.

To assemble the coupling, plug portion 13 and retaining ring 12 are placed on waveguide section 1 as described above and the collar 14 is placed on waveguide section 2, the flanges 3 and 4 are brought into alignment and pins 11 inserted in their corresponding through-holes 5 in flange 3, plug 13 is then threaded into collar 14. Friction between the threads 15 and 24 will cause the collar 14 to rotate in the same direction as the plug until the pins 29 contact the edge 30 of the flange when further turning movement of the collar will be prevented. Further rotation of the plug will draw the plug and collar together and cause the flanges 3 and 4 to be pulled together between the retaining ring 12 and the segments 31 of the plate 27, compressing the gasket 10 to form a seal between the two waveguide sections.

Disassembly of the coupling unit is accomplished by applying a rotative force to the collar 14 in a direction to move the pins 29 away from engagement with the edge of flange 4. Friction between the threads being greater than friction between the coupling unit and the flanges, the unit can be turned as a whole to a point where the opening in the plate 27 is in alignment with the edges of flange 4 and waveguide section 2 can be withdrawn from the coupling. The coupling unit remains together, captive on waveguide section 1, thus minimizing loss or misplacement of parts composing the coupling.

Obviously many modifications and variations of the present invention are possible in the light of the above teachings. It is therefore to be understood that within the scope of the appended claims the invention may be practiced otherwise than as specifically described.

What is claimed is:

1. In a coupling device for waveguide sections having similar angular flanges at their ends to be joined, an externally threaded cylindrical member having an opening therethrough of similar configuration as the flanges permitting said member to pass over one of the flanges onto one of the waveguide sections, means positionable on said one waveguide section between said member and said one flange to prevent the withdrawal of said member over the flange, a collar closed at one end and being internally threaded for mating engagement with the external threads on said member, the closed end of the collar having therethrough an angular opening of similar configuration as the flanges permitting said collar to pass over the flange on the other waveguide section, means on said collar engageable with the last mentioned flange to limit rotation of the collar in one direction with respect thereto and position said opening out of registry with its associated flange so that continued rotation of said member in a direction to engage its threads with those on the collar will draw the flanges towards each other.

2. In a coupling device for waveguide sections of non-equilateral rectangular cross-section and having rectangular coupling flanges at their ends, an externally threaded coupling member having a hole therethrough of configuration similar to that of the flanges whereby it may be assembled over one of said flanges onto one of said waveguide sections, an annular retaining ring having a side opening of a width somewhat greater than the shorter dimension of the waveguide cross-section but smaller than the longer dimension thereof, whereby it may be assembled on said one of said waveguide sections to retain said member thereon, an internally threaded collar closed at one end, the closed end of the collar having a hole therethrough of configuration similar to that of the flanges and a pair of pins on said closed end projecting toward the open end of the collar and engageable with the waveguide flange to limit rotation of the collar with respect to said flange.

References Cited in the file of this patent

UNITED STATES PATENTS

| | | |
|---|---|---|
| 269,626 | Bodel | Dec. 26, 1882 |
| 459,907 | Hogan | Sept. 22, 1891 |
| 582,611 | Anderson | May 18, 1897 |
| 652,904 | Stroh | July 3, 1900 |
| 939,435 | McVoy | Nov. 9, 1909 |
| 1,925,671 | Mansfield | Sept. 5, 1933 |
| 2,317,729 | Bruno | Apr. 27, 1943 |